April 22, 1924.

W. E. HOKE

PRECISION GAUGE

Filed April 9, 1919    2 Sheets-Sheet 1

INVENTOR,
William E. Hoke
BY S. Jay Teller
ATTORNEY

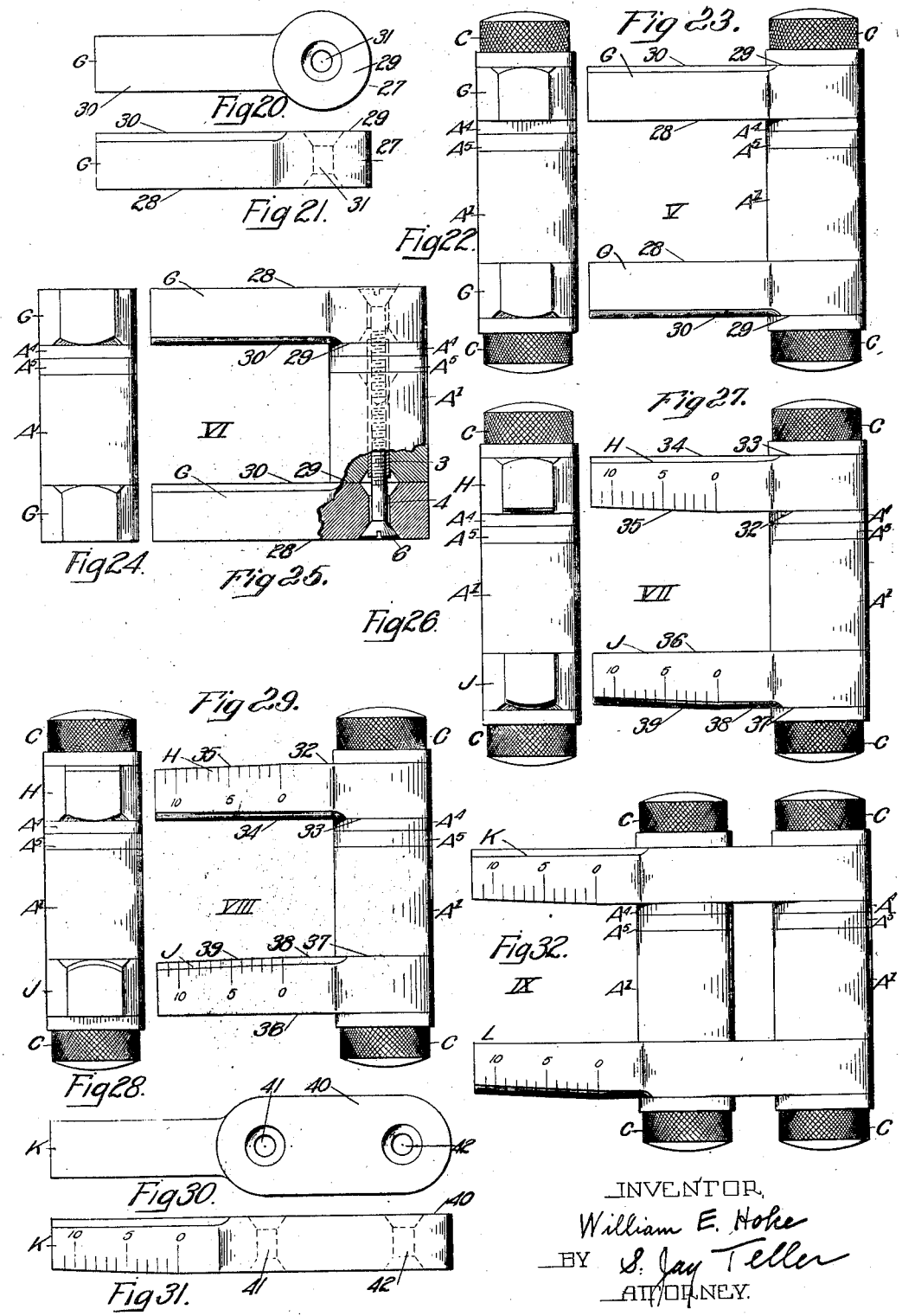

Patented Apr. 22, 1924.

1,491,098

UNITED STATES PATENT OFFICE.

WILLIAM E. HOKE, OF ST. LOUIS, MISSOURI, ASSIGNOR TO PRATT & WHITNEY COMPANY, OF NEW YORK, N. Y., A CORPORATION OF NEW JERSEY.

PRECISION GAUGE.

Application filed April 9, 1919. Serial No. 288,787.

*To all whom it may concern:*

Be it known that I, WILLIAM E. HOKE, a citizen of the United States, residing at St. Louis, Missouri, have invented certain new and useful Improvements in Precision Gauges, of which the following is a specification.

This invention relates to gauge blocks provided with opposite parallel flat gaging faces at a predetermined distance apart and to gauges made up of a series of such blocks either alone or in combination with supplemental gauge elements. One object of the invention is to provide improved means for connecting the blocks together or for connecting them to other elements. Another object is to provide certain improved combinations of gauge blocks with other gauge elements. Still further objects will be apparent from the following specification and claims.

Gauge blocks embodying the invention may be made in accordance with the method and machine set forth in my copending application for method of and machine for making gauges and other articles, Serial No. 289,591, filed April 12, 1919. I do not however limit myself as concerns the method or the machine.

In the accompanying drawings I have illustrated several forms of gauge blocks and several different gauges made either entirely or partly by combinations of gauge blocks. It will be understood, however, that the drawings are intended for illustrative purposes only and are not to be construed as defining or limiting the scope of the invention, the accompanying claims being relied upon for that purpose.

Of the drawings:

Figs. 1 and 2, 3 and 4, and 5 and 6 are end and longitudinal sectional views respectively of different gauge blocks constructed in accordance with the invention.

Figs. 20 and 21 are plan and side views respectively of a supplemental gauge element in the form of a gauge bar.

Figs. 22 and 23 are front and side views respectively of a gauge including bars such as shown in Figs. 20 and 21.

Figs. 24 and 25 are front and side views respectively of another gauge including bars such as shown in Figs. 20 and 21, the bars being in a relation opposite to that shown in Figs. 22 and 23.

Figs. 26 and 27 are views similar respectively to Figs. 22 and 23 but illustrating a gauge including different gauge bars.

Figs. 28 and 29 are views similar respectively to Figs. 26 and 27 but showing the gauge bars in reversed relation.

Figs. 30 and 31 are plan and side views respectively of a gauge bar adapted to be used in combination with two series of gauge blocks.

Fig. 32 is a side view of a gauge including bars of the type shown in Figs. 30 and 31.

Figure 1:
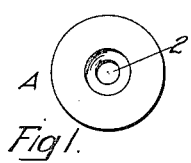
Figure 3:
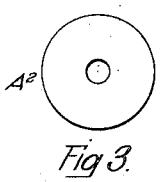
Figure 5:
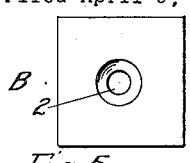
Figure 2:
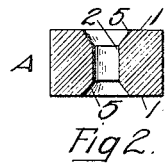
Figure 4:
Figure 6:
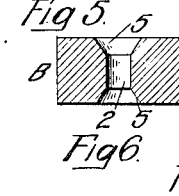

In Figs. 1 and 2 I have shown a gauge block A constructed in accordance with the invention. In Figs. 3 and 4 I have shown a block $A^2$ which is similar but much shorter. The blocks A and $A^2$ are circular and this shape is preferred for many purposes. However blocks with other shapes may be provided and in Figs. 5 and 6 I have shown a square block B.

Figures 7, 8:
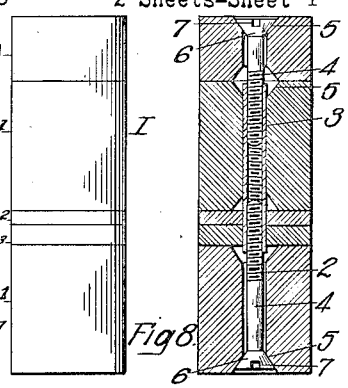
Fig. 7 is a side view of a series of gauge blocks forming a built-up gauge.
Fig. 8 is a longitudinal sectional view of a built-up gauge having a tie-rod for holding the several blocks together.

Each block has opposite gaging faces arranged in predetermined precise relationship to each other, at least one of the faces being flat so that the block may have face to face contact with another block or gauge element having a similar flat face. Preferably, as illustrated, each of the regular blocks (as contrasted with the supplemental blocks or gauge elements to be described) has parallel plane or flat end surfaces 1, 1 which are at a predetermined distance apart. By means of my improved method and machine, as set forth in my aforesaid copending application Serial No. 289,591, each block may be made without any error greater than one one-millionth of an inch in the flatness or the parallelism of the end faces or in the length between them. Ordinarily the blocks are furnished in sets of assorted lengths, the transverse size and shape of all of the blocks of the set preferably being the same. The lengths of the blocks are either multiples or definite fractions, usually decimal fractions, of a predetermined unit of length. This unit may be the inch, or the centimeter or any other convenient unit of length. If the inch is the unit decided upon, the lengths of the blocks are ordinarily multiples of a thousandth of an inch or multiples of a ten-thousandth of an inch. For a given set of blocks with lengths in multiples of thousandths the lengths may be so selected as to make it possible, by combining different blocks in face to face wringing or surface contact, to construct a built-up gauge having any desired length measured in inches and thousandths; and, by adding to the set other blocks having lengths in multiples of ten-thousandths it is possible, by combining the blocks, to construct a gauge having any desired length measured in inches and ten-thousandths. Such a combined or built-up gauge I is illustrated in Fig. 7. The total length of the gauge is obviously the sum of the total lengths of the individual blocks A, A¹, A², A³ and A⁴. By properly selecting the several blocks any desired total length can be secured.

A gauge I, such as shown in Fig. 7, will serve as a measure of length for the usual class of work requiring precision measurements. It can be used directly for measuring or checking the distance between two opposed points or surfaces, or it can be used for purposes of comparison by means of a suitable comparing device.

It is well known that several gauge blocks of the type herein shown will adhere with considerable force when properly wrung together. It is therefore possible, and in many cases preferable, to combine the blocks and to use them without any special mechanical means for holding them together. I prefer, however, to make it possible to connect the blocks mechanically so that reliance need not be placed solely upon the force resulting from wringing contact. Each block is therefore provided with an abutment preferably located between the opposite gaging faces thereof or at least between the confines of the said gaging faces. The abutment is adapted to be engaged by a suitable connecting means which extends from one block to another. The said connecting means is so constructed and arranged that it holds the several blocks together but nevertheless leaves unobstructed the outer gaging faces of the end blocks or at least leaves unobstructed the major portion of the said faces so that they can contact directly with the parts to be gaged. With the blocks thus mechanically connected a strong and rigid gauge is secured which can be handled in the same way as an integral gauge.

Preferably each block is provided with an opening to receive the connecting means, and, as illustrated, the opening in each block is a central hole 2 extending entirely through the block. When the block has its end faces flat and parallel the hole 2 extends perpendicularly to the said parallel faces. As a connecting means I preferably provide a suitable tie-rod adapted to extend through the holes in the several blocks. The tie-rod may be varied as to details, but the construction illustrated in Fig. 8 has been found convenient. This consists of a central threaded tube 3 adapted to enter the holes 2, and two screws 4, 4 entering the tube. Preferably the opening or hole in each block is utilized to form the abutment which is engaged by the connecting means, this abutment being located, as aforesaid, between the opposite gaging faces. When the opening is a central through hole such as 2 the abutment is formed by countersinking the hole at least at one end as indicated at 5. Preferably the hole is countersunk at both ends to provide separate abutments, but this is not essential. The countersinks may be omitted in the case of short blocks such as A². The screws 4, 4 are formed with heads 6, 6 adapted to enter the countersinks 5, 5 in the outermost ends of the outermost blocks and to lie below and leave unobstructed the corresponding outermost faces 1, 1 thereof. Ordinarily a number of screws with different lengths are provided so as to accommodate different combinations of blocks. It will be seen that by turning the screws the tie-rod as a whole can be shortened to draw and hold the blocks together. The heads 6, 6 are preferably provided with slots 7, 7 to permit the use of a screw driver, but this is ordinarily not necessary as tightening can be effected by relatively turning the end blocks which turn the screws by frictional engagement therewith.

For certain classes of work it is desirable to provide supplemental gauge blocks or elements to be used in conjunction with the regular gauge blocks such as are illustrated in Figs. 1 to 8. Each of the supplemental gauge blocks or elements preferably has opposite gaging faces in predetermined precise relationship to each other, and at least one of the faces is flat in order to permit the supplemental element to have face to face wringing or surface engagement with one of the regular blocks. Each of the supplemental gauge blocks or elements, like the regular blocks, is provided with an abutment adapted to be engaged by a connecting means, this abutment preferably being located between the opposite gaging faces. The abutment is preferably formed by an opening or a hole in the block though it is not necessarily formed by countersinking a through hole as has been illustrated in the case of the regular blocks. In the drawings I have shown several supplemental gauge elements, but it will be understood that other such elements may be provided as required for particular needs.

One or more of these supplemental gauge blocks or elements can be combined with one or more of the regular gauge blocks to form special gauges adapted for various purposes. These special gauges are connected together by tie-rods or other suitable connecting means such as already described.

Figure 9:
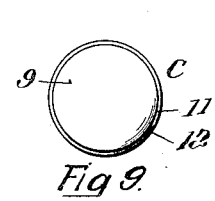
Figs. 9 and 10 are end and side views respectively of a supplemental gauge element in the form of an end block.
Figure 10:
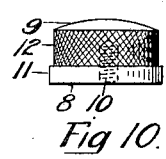
Figure 11:
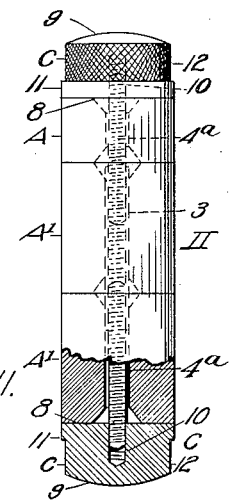
Fig. 11 is a view of a gauge including end blocks such as shown in Figs. 9 and 10.

For measuring or checking internal dimensions I provide special end blocks C, as shown in Figs. 9 and 10. The blocks are adapted to be placed at the ends of a series of regular blocks, thus forming a special gauge II, as shown in Fig. 11. Each gauge block C has a flat face 8 at one end and a spherical face 9 at the other, the maximum length between the two faces being definite and predetermined, as for instance one-half of the predetermined unit. In the case of a circular block, as shown, there is preferably provided a part 11 adjacent the face 8 which is of the same diameter as the regular blocks, and a part 12 adjacent the face 9 which is of slightly reduced diameter and which is knurled to permit the block to be easily turned. The spherical end faces 9 enable the gauge to be used in a cylindrical hole. Each of the blocks is provided with a central hole 10 which is threaded to form an abtument for the engagement of a connecting means. As illustrated, the several blocks including the special end blocks C—C are held in place by a tie-rod which consists of a tube 3 and screws 4ª, 4ª threaded at both ends. These screws at their inner ends enter the tube 3 and at their outer ends enter the said threaded apertures 10, 10 in the blocks C—C. By turning the blocks C—C the tie-rod can be tightened to draw and hold all of the blocks together, thus forming a strong unitary built-up gauge II. By selecting the proper blocks such as A, A¹ and A¹ this gauge II can be used, as before stated, for measuring or checking the diameter of cylindrical holes or for measuring or checking other internal dimensions.

Figure 12:
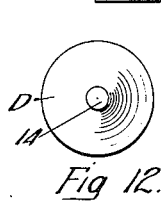
Figs. 12 and 13 are end and side views respectively of another end block for a gauge.
Figure 13:
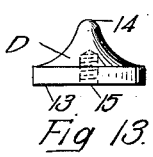
Figure 14:
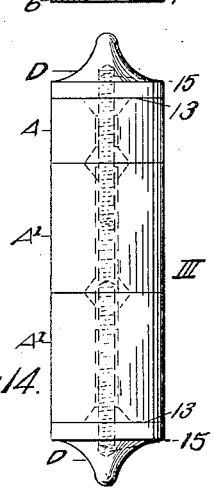
Fig. 14 is a view of a gauge including end blocks such as shown in Figs. 12 and 13.

For special purposes, as for instance measuring the rifling of cannon, it is desirable to provide other special end blocks D, as shown in Figs. 12 and 13. Each gauge block D has a flat face 13 at one end, the other end being relatively narrow and having a spherical face 14. The maximum length between the two faces is definite and predetermined, as for instance one-half of the predetermined unit. Each block is provided with a central threaded aperture 15. Two of the blocks D, D can be combined with a series of regular blocks to form a special gauge III, as shown in Fig. 14.

Figure 15:
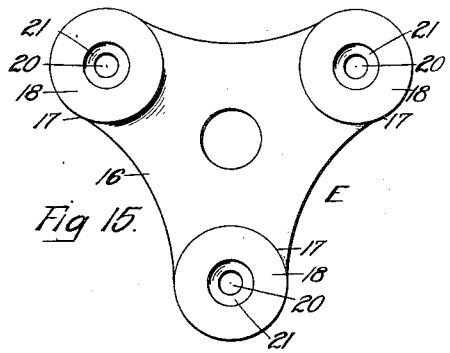
Figs. 15 and 16 are plan and side views respectively of a combined base plate and supplemental gauge element.
Figure 16:
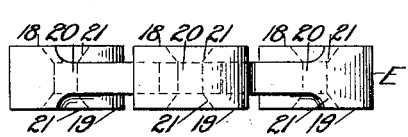

It is frequently desirable to provide a gauge base which is larger than that provided by the end of one of the regular blocks. Figs. 15 and 16 show a base plate E such as may be used, but I do not limit myself as concerns the details of construction of this base plate. As illustrated, the base plate E comprises a central web 16 and three equally spaced bosses 17 preferably of the same diameter as the regular blocks. The three bosses are provided at one end with flat faces 18 all in the same plane, and at the other end with parallel flat faces 19 all in the same plane. The length of the bosses between the faces 18 and 19 is definite and predetermined, as for instance one-half of the predetermined unit. Each boss is provided with a central hole 20 of the same diameter as the holes 2 and similarly countersunk, as indicated at 21. It will be seen that gauge can be constructed by positioning a series of regular blocks on any one of the bosses 17 and connecting them thereto by means of a tie-rod including a screw 4. Inasmuch as the distance between the faces of the base plate is known, the base plate constitutes one of the elements of the gauge in which it is included.

Figure 17:
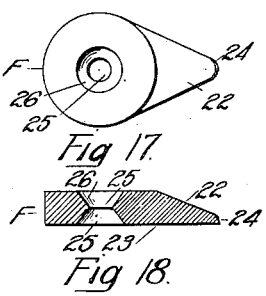
Figs. 17 and 18 are end and side views respectively of a supplemental gauge element in the form of a scriber.
Figure 18:
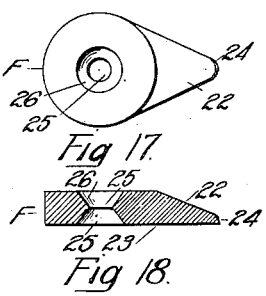

It is frequently necessary to make a mark on a piece of work at a given distance above a flat surface, which may be a surface plate. For this purpose I provide a gauge element in the form of a scriber F, as shown in Figs. 17 and 18. This is provided with a body part, which is preferably of the same diameter as the regular blocks, and with a scribing finger 22. The scriber has a flat face 23 and scribing point located in this face. The scriber is adapted to be placed at the end of series of blocks with the face 23 engaging the face 1 of the end block. Preferably, as shown, the scriber has a round nose and a front face 24 which is nearly perpendicular to the face 23. This construction enables the scriber to effect a burnishing rather than a cutting of the surface to be marked. In practice, the scriber is pressed against the surface, effecting a burnishing thereof along a relatively broad band. The lower edge of this band constitutes the mark to be used in subsequent operations. A hole 25 is provided in the body part of the scriber, this hole being countersunk as indicated at 26, so that the scriber can be secured to the end of a series of blocks by means of a tie-rod including a screw 4, or by means of a tie-rod including a screw 4ª used in conjunction with a suitable nut.

Figure 19:
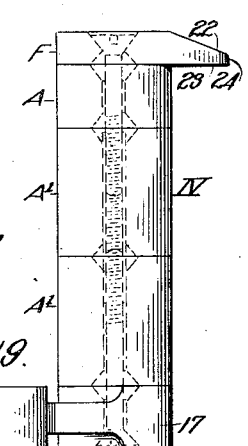
Fig. 19 is a side view of a gauge including the base plate shown in Figs. 15 and 16 and the scriber shown in Figs. 17 and 18.

Fig. 19 shows a scribing gauge IV which includes a base plate E and a scriber F combined with a series of regular blocks. This is a desirable combination, but it will be understood that neither the base plate nor the scriber is limited to use in combination with the other.

The base plate and the scriber and the combination gauge such as IV are not claimed specifically as parts of the present invention, these being presented in my co-pending application for precision gauge and scriber, Serial No. 288,789, filed on even date herewith.

Figs. 20 and 21 show a supplemental gauge bar G. This bar has a boss 27 preferably of the same diameter as the regular blocks. The bar has opposite parallel faces 28 and 29 preferably at a definite predetermined distance apart. One of the faces, as for instance 28, extends the entire length of the bar. Preferably the other side of the bar is made convex, there being provided a cylindrical face 30 tangent to a continuation of the face 29. The boss 27 is provided with a central hole 31 which is countersunk in the usual manner.

Two of the bars G, G can be mounted at the ends of a series of regular gauge blocks to form an external or snap gauge or an internal or plug gauge, or a combined snap and plug gauge such as V, shown in Figs. 22 and 23. For connecting the elements of the gauge together there is shown a tie-rod including screws 4ª, 4ª engaged by suitable nuts. As a matter of convenience end blocks C, C are used as nuts, but I do not limit myself in this respect. The distance between the faces 28, 28 is determined by the total lengths of the blocks A¹, A⁴ and A⁵, and the gauge can be used in the usual way for measuring or checking the external dimensions of various pieces. The distance between the faces 30, 30 is determined by the total of the lengths of the blocks A¹, A⁴ and A⁵ plus the thicknesses of the two bars G, G. The gauge can be used for measuring or checking internal dimensions, and inasmuch as the surfaces 30, 30 are convex, the gauge is especially adapted to be used for measuring or checking the diameters of holes. When the end blocks C, C are used, as shown, the same gauge can also be used for measuring or checking larger internal dimensions, as already described in connection with the gauge II.

In Figs. 24 and 25 I have shown a gauge VI somewhat similar to the gauge V but having the gauge blocks G, G arranged in reversed relation. The gauge VI also differs from the gauge V in that the end blocks C, C are omitted, the gauge bars being held in place by a tie-rod including headed screws 4. The reversed relation of the gauge bars enables the gauge to be used for special classes of work, as for instance the measuring of the distance between the adjacent edges of two parallel holes.

Figs. 26 and 27 show a gauge VII which is similar to the gauge V but which includes gauge bars H and J differing somewhat from the gauge bars G, G. The bar H is provided with faces 32, 33 and 34 similar respectively to the faces 28, 29 and 30 of the bar G, but adjacent the face 32 there is an inclined flat face 35. The inclination is very slight, that shown in the drawings being greatly exaggerated. At the side of the bar are graduations ranging for instance from 0 to at least 10. When the regular gauge blocks are made in multiples of a thousandth of the predetermined unit then the amount of inclination from the 0 mark to the 10 mark is a thousandth of the predetermined unit. The gauge bar J is provided with faces 36, 37 and 38 similar respectively to the faces 28, 29 and 30 of the bar G, but adjacent the face 38 there is an inclined convex face 39. The inclination is very slight, that shown in the drawings being greatly exaggerated. At the side of the bar are graduations ranging for instance from 0 to at least 10. When the regular gauge blocks are made in multiples of a thousandth of the predetermined unit then the amount of inclination from 0 to the 10 mark is a thousandth of the predetermined unit.

When the bars H and J are used as part of a gauge such as VII, they make it possible for measurements to be made to ten-thousandths of the predetermined unit even though the regular blocks are made only in multiples of a thousandth. When used as an external or snap gauge, the bars are passed over the work until contact is effected. The distance between the faces 32 and 36 is the total of the lengths of the several regular blocks, this distance being a multiple of a thousandth of the predetermined unit. Inasmuch as the amount of inclination of the face 35 of the bar H is a thousandth each of the ten divisions of the scale represents a ten-thousandth. The size of the work being gaged can therefore be determined by noting the point along the scale of the bar H at which contact is reached. The total length of the blocks plus the scale reading is the desired dimension. When the gauge is used as an internal or plug gauge, the method is similar. The bars are entered in a hole or between faces to be gaged until contact is effected. Readings are taken from the scale on the bar J.

Figs. 28 and 29 show a gauge VIII which is similar to the gauge VII except that the gauge bars H and J are placed in reverse relation. The manner of using this gauge will be obvious from the description which has heretofore been given in connection with the gauges VI and VII.

Figs. 30 and 31 show a gauge bar K which is adapted to be used in conjunction with two series of regular blocks. The bar has an elongated boss 40 provided with two spaced holes 41 and 42 therein. The bar K is shown as being otherwise similar to the bar H, but it will be understood that there can be variation from the construction shown.

Fig. 32 shows a gauge IX including a bar K and a bar L similar to the bar K as concerns the elongated boss but otherwise like the bar J. The gauge IX includes two series of regular gauge blocks, the blocks of the two series being selected so as to have the same total length. The gauge IX has the advantage of greater rigidity, but it is otherwise similar to the gauges heretofore described.

The supplemental gauge bars and the combination gauges such as II, III, V, VI, VII, VIII and IX are not claimed specifically as parts of the present invention, these being presented in my copending application for precision gauge, Serial No. 288,790, filed on even date herewith.

What I claim is:

1. A gauge block provided with opposite gaging faces in predetermined precise relationship to each other, at least one of the faces being flat so that the said block may have face to face wringing or surface contact with another block or gauge element having a similar flat face, the said block also being provided with a hole extending therethrough from one face to the other and countersunk to form an abutment located between the said faces, whereby the block may be connected in face to face contact with another block or gauge elements such as that aforesaid by a tie rod extending through the hole and having a head engaging the countersunk abutment and positioned to leave unobstructed the gaging face of the block opposite the said engaged flat face.

2. A gauge block provided with opposite parallel flat engaging faces at a predetermined distance apart, the said block being adapted to have face to face wringing or surface contact with another block or gauge element having at least one similar flat face, the said block also being provided with a hole extending therethrough from one face to the other perpendicularly thereto and countersunk to form an abutment located between the said opposite parallel faces, whereby the block may be connected in face to face contact with another block or gauge element, such as that aforesaid, by a tie rod extending through the hole and having a head engaging the countersunk abutment and positioned to leave unobstructed the gaging face of the block opposite the said engaged face.

3. The combination of a plurality of similar gauge blocks forming a built-up gauge and provided respectively with opposite gaging faces in predetermined precise relationships which are different for different blocks, at least one of the faces of each block being flat so that any desired number of the said blocks may be combined with the successive blocks in face to face wringing or surface contact with each other, each of the said blocks also being provided with an abutment located between the confines of the said opposite faces thereof, and connecting means for said blocks whereby any desired combination of the blocks may be connected together in face to face contact by said connecting means engaging the abutments of the end blocks of the combination and positioned to leave unobstructed the outer gaging faces of the end blocks.

4. The combination of a plurality of similar gauge blocks forming a built-up gauge and provided respectively with opposite parallel flat gaging faces at predetermined precise distances apart which distances are different for different blocks, the said blocks being adapted for the formation of any desired combination thereof with the successive blocks of the combination respectively having face to face wringing or surface contact with each other, each of the said blocks also being provided with a hole extending therethrough from one face to the other perpendicularly to the faces, the hole being countersunk to form an abutment located between the said opposite parallel faces, and a tie rod connecting said blocks whereby any desired number of blocks may be connected together with the blocks in face to face contact by said tie rod extending through the holes in the several blocks and having heads engaging the countersunk abutments of the end blocks of the combination and positioned to leave unobstructed the outer gaging faces of the end blocks.

5. A gauge comprising in combination a series of similar gauge blocks each provided with opposite gaging faces in predetermined precise relationship to each other, at least one of the faces of each block being flat so that the successive blocks of the series respectively have face to face wringing or surface engagement with each other, each of the blocks of the series also being provided with a hole extending from one gaging face to the other, said hole being countersunk at one end, and means extending through the holes in the several blocks to connect all of the blocks together and engaging said countersunk portion to leave unobstructed at least the major portion of the outer gaging faces of the gauge.

6. A gauge comprising in combination a series of similar gauge blocks each provided with opposite gaging faces in predetermined precise relationship to each other, at least one of the faces of each block being flat so that the successive blocks of the series respectively have face to face wringing or surface engagement with each other, each of the end blocks of the series also being provided with an abutment located between the confines of the said opposite faces thereof, and means engaging the abutments of the said end blocks to connect all of the blocks together and positioned to leave unobstructed the outer gaging faces of the gauge.

7. A gauge comprising in combination a series of similar gauge blocks each provided with opposite parallel flat gaging faces at a predetermined precise distance apart, the successive blocks of the series respectively having face to face wringing or surface engagement with each other, each of the blocks of the series also being provided with an opening the wall of which forms an abutment located between the confines of the said opposite faces thereof, and means extending into the openings and engaging the said abutments to connect all of the blocks together and positioned to leave unobstructed the outer gaging faces of the gauge.

8. A gauge comprising in combination a series of similar gauge blocks each provided with opposite parallel flat gaging faces at a predetermined precise distance apart, the successive blocks of the series respectively having face to face wringing or surface engagement with each other, each of the blocks of the series also being provided with a hole extending therethrough from one face to the other perpendicularly thereto, the end blocks being countersunk to form abutments located between the said opposite faces, and a tie rod extending through the holes in the several blocks and having heads engaging the abutments of the end blocks to connect all of the blocks together and positioned to leave unobstructed the outer gaging faces of the gauge.

9. A gauge comprising in combination a plurality of gauge blocks at least one being provided with opposite flat gaging faces in predetermined precise relationship to each other, the several blocks respectively having face to face wringing or surface engagement with each other, a supplemental gauge element different from the blocks but also having opposite gaging faces in predetermined precise relationship, the supplemental gauge element having at least one flat face which is in wringing or surface engagement with a flat face of the block at one end, the said blocks and the said supplemental gauge element each also being provided with an abutment located between the confines of the said opposite faces thereof, and means engaging the abutment of said element and of the block at the opposite end of the series to connect the blocks and the supplemental gauge element together and positioned to leave unobstructed the outer gauging faces of the gauge.

10. A gauge comprising in combination a plurality of gauge blocks at least one being provided with opposite parallel flat gauging faces at a predetermined precise distance apart, the several blocks respectively having face to face wringing or surface engagement with each other, a supplemental gauge element different from the blocks but also having opposite gaging faces in predetermined precise relationship, the supplemental gauge element having at least one flat face which is in wringing or surface engagement with a flat face of the block at one end, the said blocks and the said supplemental gauge element each also being provided with a hole perpendicular to the flat faces or face and the wall of which forms an abutment located between the said opposite faces thereof, and means engaging the said abutments to connect the blocks and the supplemental gauge element together and positioned to leave unobstructed the outer gauging faces of the gauge.

11. A gauge comprising in combination a plurality of gauge blocks at least one being provided with opposite parallel flat gaging faces at a predetermined precise distance apart, the several blocks respectively having face to face wringing or surface engagement with each other, two supplemental gauge elements different from the blocks but also having opposite gaging faces in predetermined precise relationships, the supplemental gauge elements each having at least one flat face and the two flat faces being in wringing or surface engagement with the flat faces of the blocks at the ends, the said blocks and the said supplemental gauge elements each also being provided with a hole perpendicular to the flat faces or face and the wall of which forms an abutment located between the said opposite faces thereof, and means engaging the said abutments to connect the blocks and the supplemental gauge elements together and positioned to leave unobstructed the outer gaging faces of the gauge.

In testimony whereof, I hereto affix my signature.

WILLIAM E. HOKE.